United States Patent [19]

Zimmerman

[11] Patent Number: 4,550,805

[45] Date of Patent: Nov. 5, 1985

[54] HYDROSTATIC LUBRICATION SYSTEM FOR A WALKING BEAM

[76] Inventor: Gregory L. Zimmerman, 625 S. Patton, Denver, Colo. 80209

[21] Appl. No.: 676,852

[22] Filed: Nov. 30, 1984

[51] Int. Cl.[4] ............................................. F16N 1/00
[52] U.S. Cl. ........................................ 184/18; 184/5; 92/153; 92/156
[58] Field of Search ............... 184/5, 5.1, 18, 19, 184/100; 92/153, 156

[56] References Cited

U.S. PATENT DOCUMENTS

| | | | |
|---|---|---|---|
| 2,665,901 | 1/1954 | Patterson | 184/18 X |
| 2,827,860 | 3/1958 | Roberts | 92/160 X |
| 4,345,734 | 8/1982 | Studinger | 248/669 |

FOREIGN PATENT DOCUMENTS 18166 of 1902 United Kingdom ................. 92/159

Primary Examiner—Leonard E. Smith
Attorney, Agent, or Firm—Edwin H. Crabtree

[57] ABSTRACT

An improved lubrication system for the hydrostatic lubrication of an upper bearing and cylinder wall and piston of a walking beam compressor. The lubrication system introduces oil under pressure, around an upper bearing used for supporting a piston shaft connected to the piston of the walking beam compressor. The system having a pressure relief valve for relieving the pressure in the bearing and discharging excess oil into the top of the compressor and lubricating the cylinder wall and the sides of the piston.

4 Claims, 3 Drawing Figures

HYDROSTATIC LUBRICATION SYSTEM FOR A WALKING BEAM

BACKGROUND OF THE INVENTION

This invention relates to an improved lubrication system for lubricating a bearing, piston and cylinder and more particularly but not by way of limitation to a walking beam compressor used in conjunction with a walking beam oil pump. The compressor used for compressing low pressure natural gas.

In a walking beam compressor which is activated by the motion of a walking beam of a walking beam oil pump, the lubrication of bearings, piston and inner cylinder wall of the compressor is extremely important. Natural gas which is compressed provides a foreign environment which dilutes and dissolves the oil lubricants. This causes a critical lubrication problem greatly reducing the wear life of the bearings, piston, piston rings and cylinder wall.

In the past, lubrication has been introduced by drip feed around the top of a piston shaft with the oil circulating downwardly along the length of the piston shaft saturating a felt oil retaining wiper mounted on top of the piston. The wiper introduces oil along the sides of the cylinder wall as the piston is raised and lowered in the cylinder. While the wiper may provide adequate lubrication there was no system for providing improved hydrostatic lubrication around the upper bearing used for supporting the piston shaft. This problem is multiplied when the compressor is used as a double acting system. Quite often the seals in the upper bearing are starved for adequate lubrication causing the loss of seals, increased bearing wear and accordingly down time with high maintenance costs.

In the following U.S. patents various types of compressor lubrication systems are described. They are U.S. Pat. No. 729,537 to Buffum, U.S. Pat. No. 754,121 to Brush, U.S. Pat. No. 832,956 to Castelnau, U.S. Pat. No. 2,166,857 to Bugatti, U.S. Pat. No. 2,317,004 to Wallgren et al, U.S. Pat. No. 2,665,901 to Patterson, U.S. Pat. No. 4,005,763 to Wallis. None of these prior art patents address the problem of natural gas walking beam compressor lubrication nor do they describe the unique features and advantages of the improved lubrication system for the upper bearing of a walking beam compressor for providing hydrostatic lubrication to the bearing and seals along with introducing excess oil to the top of the compressor.

SUMMARY OF THE INVENTION

The subject walking beam lubrication system provides an improved hydrostatic lubrication system for the upper bearing and seals of a walking beam compressor.

Oil is introduced under pressure from a pressure oil lubricator. The system includes an adjustable pressure relief valve to insure that oil is introduced under an acceptable pressure in and around the piston shaft bearing and seals. When the oil pressure is exceeded in the bearing, an adjustable pressure relief valve is opened and excess oil is introduced through an excess oil line in the top of the compressor for providing additional lubrication to upper cylinder wall and piston when the walking beam compressor is used as a double acting compressor for compressing natural gas introduced both in the top and bottom portions of the compressor cylinder.

The improved lubrication system increases the wear life of the upper piston shaft bearing and seals with increased lubrication and cooling of the piston in the compressor.

Further with the improved lubrication of the bearing and seals, there is less coefficient of friction around the piston shaft as the piston and piston shaft are raised and lowered by the walking beam pump thereby providing overall improved efficiency of the walking beam compressor.

The improved lubrication system for lubricating the upper bearing and cooling of the piston and cylinder wall of the walking beam compressor includes a pressure oil lubricator connected to an oil line. The line is connected to the side of the bearing housing for introducing oil under pressure around the piston shaft. An exhaust port is in the side of the bearing which is connected to an adjustable pressure relief valve. Excess oil is discharged to an excess oil line in the top of the compressor for discharging the oil around the cylinder wall and the sides of the piston.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
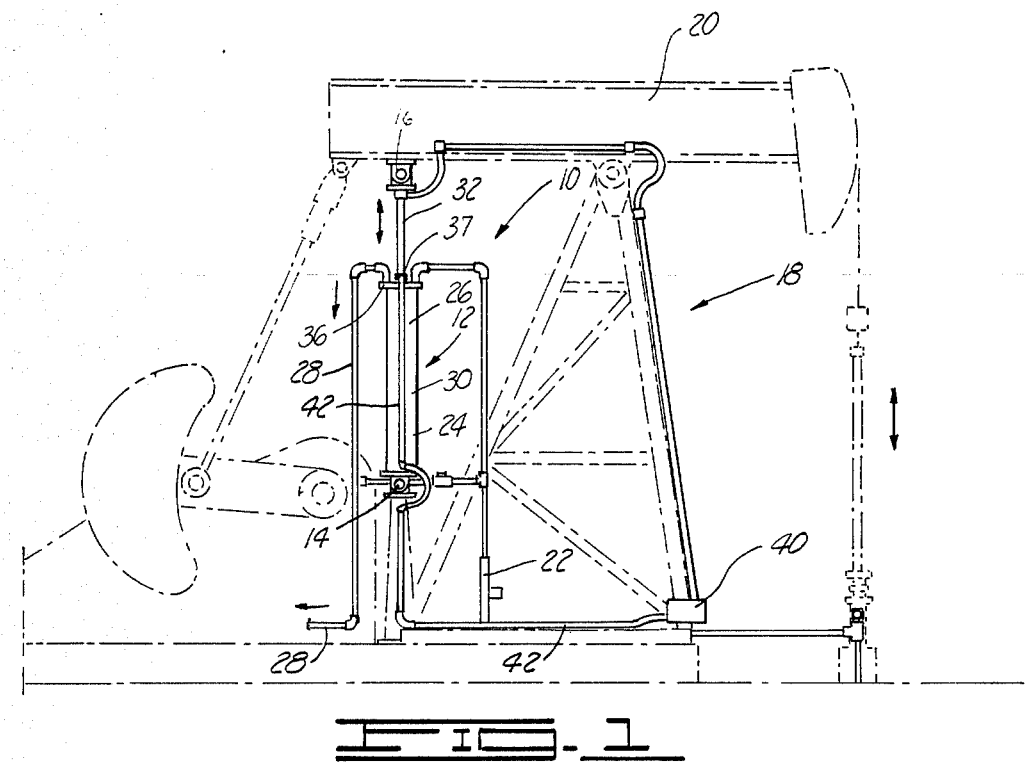
FIG. 1 illustrates a view of the lubrication system attached to a compressor mounted on a walking beam oil pump shown in dotted lines.

In FIG. 1 the improved lubrication system for lubricating the upper piston shaft bearing and cooling a piston and inner cylinder wall of a walking beam compressor is designated by general reference numeral 10. The system 10 is connected to a walking beam compressor 12 pivotally attached by a lower pivot bearing 14 and an upper pivot bearing 16 to a walking beam oil pump 18 having a walking beam 20. The walking beam compressor 12 is connected to a low pressure gas pipe 22 connected to a lower portion 24 and an upper portion 26 of the compressor 12. The compressor 12 acts as a double acting compressor for compressing low pressure natural gas and discharging the compressed gas out a high pressure gas pipe 28.

Figures 2, 3:
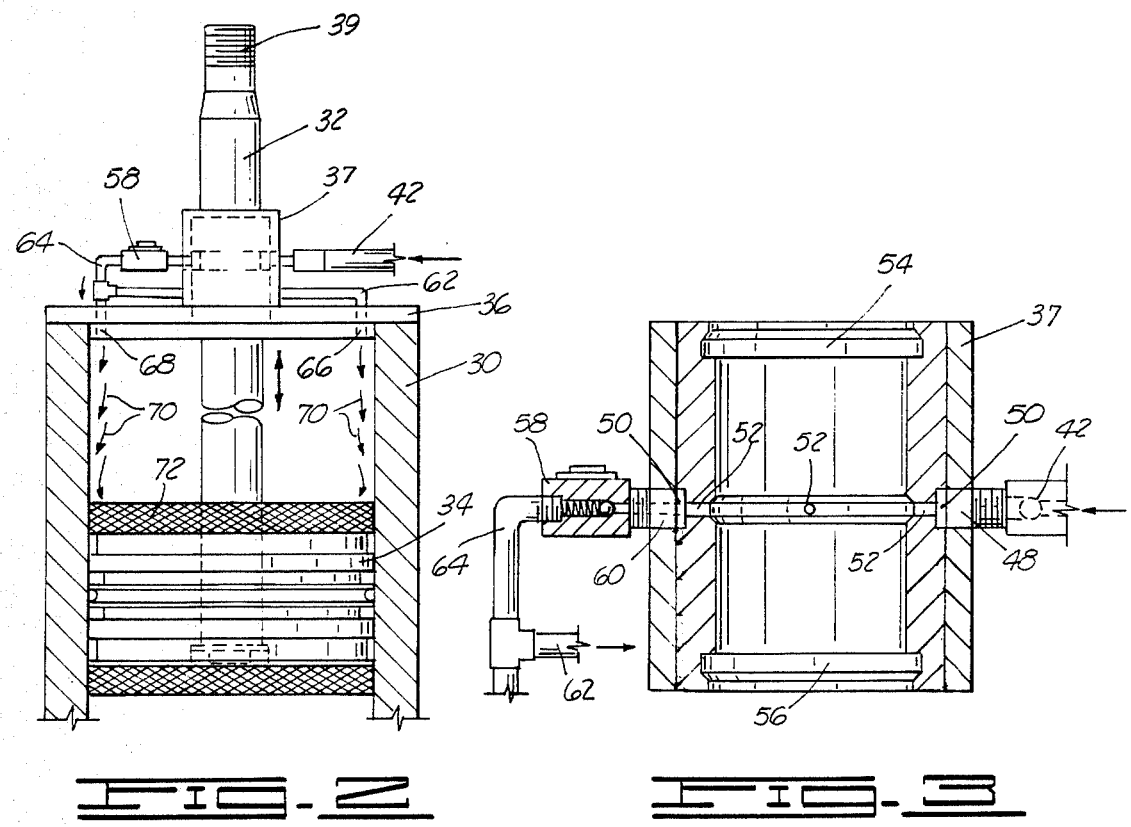
FIG. 2 is a side view of the top of the compressor with the cylinder wall in cross section and illustrating the piston, piston shaft and upper bearing.
FIG. 3 is a side sectional view of the upper bearing and the improved lubrication system with adjustable relief valve and excess oil lines.

The walking beam compressor 12 includes, in part, a cylinder 30, a piston shaft 32, a piston 34 shown in FIG. 2, an upper cylinder plate 36, a bearing housing 37 and a bearing 38 disposed around the piston shaft 32. An upper threaded end portion 39 of the piston shaft 32 as shown in FIG. 2 is connected to the upper pivot bearing 16. When the walking beam oil pump 18 is in operation, the walking beam 20 is raised and lowered as shown by arrow 41 which in turn raises and lowers the piston shaft 32 with piston 34 connected thereto for compressing the low pressure natural gas received from the gas pipe 22. The system 10 includes a pressure oil lubricator 40 having an oil line 42 and flex hose 44 connected to the bearing housing 37.

Referring to FIGS. 2 and 3, the bearing housing 37 surrounds a brass bearing 38 which is shown in cross section in FIG. 3. The oil from the oil line 42 is received through a bearing housing inlet port 48. The housing inlet port 48 communicates with a bearing oil ring 50 disposed around the outer circumference of the bearing 38. The ring 50 communicates with a plurality of bearing inlet ports 52 for introducing oil around the sides of the piston shaft 32 as it is raised and lowered inside the bearing 38.

To insure that there is no loss of pressure in the compression of the low pressure natural gas in the upper portion 26 of the cylinder 30, an upper wiper ring seal 54 and a lower wiper ring seal 56 are provided. The oil received under pressure around the sides of the piston shaft 32 not only acts to lubricate the shaft inside the bearing 38 but also provides a gas seal during the compression of the natural gas and increases the wear life of the seals. Also the wear life of the seals is insured by the addition of an adjustable pressure relief valve 58 shown in FIGS. 2 and 3. The pressure relief valve 58 communicates through the oil ring 50 which acts as an exhaust port and a bearing housing exhaust port 60. For example, by adjusting the adjustable pressure relief valve 58 in the range of 60 lbs. per sq. inch lubrication is received inside the bearing 38 with the lubricant hydrostatically introduced under pressure around the sides of the bearing and the seals. As the lubricant is received in the bearing 38 and the pressure of the lubricant increases, the pressure relief valve 58 is opened and oil is discharged through a pair of excess oil lines 62 and 64. The oil lines 62 and 64 communicate with ports 66 and 68 in the opposite sides of the top of the upper cylinder plate 36. The oil is then received around the sides of the upper cylinder wall as indicated by arrows 70 and on to the top of an oil felt pad 72 which is attached to the top of the piston 34. The pad 72 collects the oil for lubricating the cylinder wall and cooling the piston 34 as it is raised and lowered in the compressor 12. By introducing the excess oil through the excess oil lines into the top of the compressor 12 additional lubrication is provided to the piston 34 and inner cylinder wall for improved lubrication, cooling and overall efficiency in the operation of the compressor 12.

As seen in the above mentioned drawings, the improved lubrication system 10 provides lubricant hydrostatically around the upper bearing 38 for increased wear life of the bearing seals and bearings with increased operating life of the piston 34 and piston shaft 32 as it is raised and lowered in the upper bearing 38.

Changes may be made in the construction and arrangement of the parts or elements of the embodiments as described herein without departing from the spirit or scope of the invention defined in the following claims.

What is claimed is:

1. An improved lubrication system for the hydrostatic lubrication of a bearing mounted in a bearing housing and disposed around a piston shaft and cooling a piston and inner cylinder wall of a walking beam compressor, the compressor mounted on a walking beam pump, the piston connected to a piston shaft which is raised and lowered by the movement of the walking beam of the walking beam pump, the shaft supported by the bearing housing having the bearing disposed around the piston shaft, the compressor used for compressing low pressure natural gas, the system comprising:
   a pressure oil lubricator;
   an oil line connected to the lubricator;
   a bearing housing inlet port in the side of the bearing housing;
   a bearing inlet port in the bearing and communicating with the bearing housing inlet port, the inlet ports receiving oil from the oil line and introducing oil around the piston shaft;
   a bearing housing outlet port in the side of the bearing housing communicating with the inlet port;
   an adjustable pressure relief valve connected to the bearing housing outlet port; and
   excess oil lines connected to the adjustable pressure relief valve and to excess oil ports in the top of the walking beam compressor for introducing excess oil into the top of the compressor and around the inner cylinder wall and the top of the piston.

2. An improved lubrication system for lubricating a bearing with seals mounted in a bearing housing and lubricating and cooling a piston and inner cylinder wall of a walking beam compressor, the compressor mounted on a walking beam pump, the piston connected to a piston shaft which is raised and lowered by the movement of the walking beam of the walking beam pump, the shaft supported by the bearing housing having the bearing disposed around the piston shaft, the compressor used for compressing low pressure natural gas, the system comprising:
   a pressure oil lubricator;
   an oil line connected to the lubricator;
   a bearing housing inlet port in the side of the bearing housing;
   a bearing inlet port in the bearing and communicating with the bearing housing inlet port, the inlet ports receiving oil from the oil line and introducing the oil around the piston shaft and bearing seals;
   a bearing housing exhaust port in the side of the bearing housing and communicating with the inlet ports;
   an adjustable pressure relief valve connected to the bearing housing port; and
   an excess oil line connected to the pressure relief valve and the top of the compressor cylinder for introducing excess oil from the bearing to the piston and inner cylinder wall.

3. The system as described in claim 2 wherein there are a pair of excess oil lines connected to the pressure relief valve, the two lines connected to opposite sides of the top of the cylinder for feeding excess oil into and along the top of the inner cylinder wall and the top of the piston.

4. The system as described in claim 2 further including a plurality of bearing inlet ports disposed in a spaced relationship radially around the bearing and communicating with a bearing oil ring disposed around the outer circumference of the bearing, the oil ring communicating with the bearing housing inlet port, the bearing inlet ports introducing oil around the side of the piston shaft.

* * * * *